3,385,723
CARBON ARTICLE COATED WITH
BETA SILICON CARBIDE
Paul B. Pickar, Orange County, Fla., assignor to Martin-Marietta Corporation, Baltimore, Md., a corporation of Maryland
No Drawing. Filed June 26, 1964, Ser. No. 378,421
12 Claims. (Cl. 117—46)

ABSTRACT OF THE DISCLOSURE

This invention relates to the manufacture of a carbon article such as a crucible, in the inner surface of which a protective coating of very pure graphite is created so that thereafter a chemically pure coating of beta silicon carbide can be formed in the crucible, without being contaminated by impurities in the carbon.

---

This invention relates to the production of carbon or graphite articles having a protective coating against highly reactive gases or liquids at high temperatures.

More particularly the invention relates to the method of producing a carbon article having a protective coating chemically bonded thereto which can be maintained for many hours with substantially no deterioration in the presence of highly reactive fluids at temperatures up to 2000° C. or so.

An important object of the present invention is to provide an extremely pure graphitic crucible in which molten silicon or other highly reactive liquids can be maintained for many hours at high temperatures without causing introduction of impurities into the melt.

A further object of the invention is to provide a crucible having a coating of polycrystalline beta silicon carbide chemically bonded to the inner surface thereof, and which coating will not react with or cause contamination of a melt held for 20 to 40 hours or more at temperatures from 1700° C. to 2000° C. for the production of semiconductor crystals of extreme purity.

Still another object of the invention is to provide a method of producing a crucible in which gases deleterious to the growth of extremely pure semi-conductor crystals, are substantially completely removed from the crucible material and in which a chemically bonded substantially impermeable coating of beta silicon carbide is formed at least on the inner surface of the crucible.

It has been proposed in U.S. Patent 1,378,189 to form a carbide coating on the inner surface of a graphite crucible to withstand high temperatures by incorporating in the crucible an oxide of metals such as aluminum, boron, thorium and magnesium, or salts of other metals, and then heating such oxides or salts to release a nascent metal to react with the carbon of the crucible to form a heat resistant coating of metal carbide thereon.

It has also been known to treat a crucible made of a carbonaceous material such as graphite, coke, gas carbon, lamp black and mixtures of carbon and clay, by embedding several crucibles in a container together with a mixture of flint and finely divided coke and to heat this mixture to reduce the silicon oxide to silicon to combine with the carbon of the crucible to form a surface coating consisting substantially of silicon carbide. However, in the process disclosed in U.S. Patent 1,804,361 no attempt was made to secure a final crucible having the crucible material and its inner lining of the extreme purity of the order of that desired and necessary for the purposes of the present invention. Flint is a somewhat impure form of silicon dioxide. Even in the above patent the analysis of the flint shows more than .5% of impurities. Neither the impurities of the flint or of the carbonaceous material would be removed by the process described in the above patent. Furthermore, if silicon carbide is formed at the high temperatures suggested in this patent, it will be of the alpha type which is of hexagonal crystalline form and will not be of the polycrystalline form of beta silicon carbide of the present invention.

A very important feature of the present invention is to provide a crucible of extremely pure graphite i.e. having less than 10 parts per million (p.p.m.) of impurities including those commonly found in graphite, and to produce a chemically bonded coating of pure beta silicon carbide thereon, said coating also having impurities in an amount less than 10 p.p.m.

In the production of a crucible according to the present invention a graphite crucible is formed preferably from a high density graphite of extreme purity i.e. having impurities in an amount of less than 10 p.p.m., and preferably less than 5 p.p.m. The crucible may be formed in any suitable manner as by machining into the desirable shape, generally that of a cup. It is then outgassed for 1 or 2 hours or longer at a temperature preferably of approximately 1800° C., under a high vacuum such as, for example, about $3 \times 10^{-5}$ mm./Hg. A still higher vacumm of about $2 \times 10^{-6}$ mm./Hg, however, is preferred. After cooling, the inner surface of the crucible is preferably abraded with a fine silicon carbide paper to ensure that the inner surface of the crucible will be thoroughly wetted by a binder solution to be applied.

The binder solution is one which upon heating to 500° C. to 600° C. or so will be burned to pure carbon. Preferably an extremely pure carbohydrate, such as sucrose or other pure sugars is used in about a 20 percent aqueous solution. The binder, however, may be a solution of pure glycerin or other pure organic compounds which may be readily burned to pure carbon. The binder solution should be of such purity that, when burned, the residual carbon will contain impurities in an amount less than 10 p.p.m. and preferably less than 5 p.p.m.

After treatment of the inner surface of the crucible with such a binder solution the crucible is placed in a reaction furnace and the binder is burned to leave a residue of pure carbon. A second coating of the binder is then applied to the inner surface of the crucible and a finely powdered, extremely pure silicon is sifted thereon. The powdered silicon for this purpose contains less than 10 p.p.m. and preferably less than 5 p.p.m., of impurities. The crucible is again placed in a reaction furnace chamber and the binder solution burned to pure carbon leaving the silicon adherent to the inner surface of the crucible.

The crucible is then placed in a high vacuum furnace and the gases evacuated at a temperature of 1000° C. or higher in a vacuum of less than $3 \times 10^{-5}$ mm./Hg for 1 or 2 hours or more, after which the temperature is raised to about 1700° C. to 2000° C., preferably about 1800° C., to cause a reaction between the silicon powder and the carbon to form a coating of yellow, polycrystalline beta silicon carbide chemically bonded and tightly adherent to the inner portion of the crucible. Care must be taken at this time not to raise the temperature of the furnace to a temperature higher than about 2000° C. or so as beta silicon carbide sublimes at higher temperatures.

It is usually preferable, although not necessary, to use a preliminary step described above of applying the binder solution and burning it to pure carbon, before the step of applying the binder solution and coating the wet solution with pure silicon powder for burning and reaction. By using the preliminary step, carbon is deposited in any slight pores or cracks in graphite and prepares the surface better for forming a more impermeable, chemically bonded, coating of beta silicon carbide on the graphite.

In order to obtain a layer of the beta silicon carbide of the desired thickness it is advisable to repeat the cycle of the steps of (a) applying a coating of the binder solution, (b) sifting pure silicon powder thereon, (c) burning the binder to pure carbon, (d) outgassing the crucible in a high vacuum at a high temperature and (e) holding the crucible at a temperature on the order of 1700° C. to 2000° C. to cause the reaction to form beta silicon carbide.

The number of such cycles is dependent upon the desired thickness of the layer of beta silicon carbide on the inside of the crucible. However, for best results it is usually desirable to repeat the above cycle for at least three or four times. For practical purposes the coating of beta silicon carbide should have a minimum thickness of about 35 microns, that is about 0.0013 inch thick, and if desirable such coating may be built up to a thickness of 0.02 or 0.03 inch or even greater.

By utilizing extremely pure materials, namely the graphite, the binder solution and the silicon powder and following the method of the invention a crucible of extreme purity is produced which is suitable for the melting and holding for many hours of extremely pure silicon or other semi-conductor or highly reactive substance without contamination thereof. Furthermore, such a crucible made in accordance with the invention may be used over and over again or even recoated with beta silicon carbide for further use, if desired.

It is usually desirable in the outgassing of the crucible to keep the crucible at a temperature of 1800° C. or so for a substantial time i.e. from one to several hours as it is essential to eliminate certain gases from the pores of the graphite. The presence of nitrogen gas, for example, is quite deleterious to the proper functioning of the crucible when maintaining certain highly reactive ingredients in molten condition.

In the above description the coating is frequently referred to as being for the inner surface of a crucible to contain a highly reactive liquid. It will be seen, however, that if desired the coating can be formed on and bonded to exterior surfaces of the crucible as well as the inner surface.

While the above description has been primarily directed to the making of a crucible of extreme purity especially for the production of semi-conductor crystals of extreme purity, it will be seen that the process is applicable to the coating of other high or low density carbon material for the formation thereon of a chemically bonded, highly resistant coating of beta silicon carbide. Various carbon or graphite shapes may have their surfaces coated to make them resistant to the contact therewith or the flow thereover, of highly reactive gases and/or liquids at high temperatures. Such carbon articles, could, for example, comprise flanges, ribs, vanes, interior or exterior walls, or both, of pipes or other conduits, containers or structures.

In applying the principles of this invention changes may be made as regards the details herein disclosed, provided the elements set forth in any of the appended claims or the equivalent of such be employed.

What is claimed is:

1. The process of producing an article of carbon with a coating resistant to highly reactive fluids at temperatures up to about 2000° C., which comprises, forming the article of carbon in the desired shape, wetting the surface of the article to be coated with a binder solution of an organic compound which may be burned to pure carbon, applying a layer of powdered silicon to the wet solution, burning the binder to pure carbon in a reaction chamber and raising the temperature of the chamber to 1700° C. to 2000° C. while degassing, whereby a chemically bonded, adherent coating of polycrystalline, yellow beta silicon carbide is formed on the surface of the article.

2. The process of claim 1 in which a preliminary step of wetting the surface of the carbon article to be coated with the binder solution and burning the binder to carbon is carried out before the application of the binder solution and the powdered silicon as specified in claim 1.

3. The process of producing a crucible of extreme purity for the holding of highly reactive materials in molten condition without causing contamination of such materials, which comprises forming a crucible in the desired shape from an extremely pure carbon, wetting the surface of the crucible with a solution of a pure organic compound which may be burned to pure carbon, applying a layer of extremely pure, powdered silicon to the binder solution, burning the binder to pure carbon, degassing the crucible in a high vacuum chamber and raising the temperature of the chamber to a temperature between 1700° C. and 2000° C. whereby a chemically bonded, adherent coating of polycrystalline, yellow beta silicon carbide is formed on the surface of the crucible.

4. The process of claim 3 in which the crucible is formed from a high density graphite containing less than 10 parts per million of impurities.

5. The process of claim 4 in which the binder solution and the powdered silicon each contain impurities in an amount of less than 10 parts per million.

6. The process of claim 3 in which the binder solution is an aqueous solution of an extremely pure carbohydrate.

7. The process of claim 3 in which the binder solution is an aqueous solution of extremely pure sucrose.

8. The process of producing an extremely pure high density graphite crucible for holding highly reactive materials in molten condition which comprises forming a crucible in the desired shape from a high density graphite having impurities of less than 10 parts per million, wetting the surface of the crucible with a binder solution of a pure organic compound which may be burned to pure carbon, sifting extremely pure silicon powder onto the wet binder solution, burning the crucible at temperature sufficient to burn the binder to pure carbon, outgassing the crucible in a high vacuum furnace and raising the temperature to about 1700° C. to 2000° C. while under the high vacuum to form a chemically bonded coating of polycrystalline beta silicon carbide on the inner surface of the crucible, and repeating the cycle of treatment with the binder solution, application of the powdered silicon thereto, burning the binder solution to pure carbon, degassing and heating in a vacuum furnace to produce a coating of the desired thickness of beta silicon carbide.

9. The process according to claim 8 in which the crucible is outgassed at a temperature of at least 1700° C. in a high vacuum furnace prior to application of the binder solution.

10. The process according to claim 8 in which the graphite forming the crucible, the silicon powder and the binder solution each contain less than 10 parts per million of impurities.

11. The process according to claim 10 in which the graphite, the silicon powder and the binder solution each contain less than 5 parts per million of impurities.

12. The process according to claim 8 in which the coating of beta silicon carbide is at least 1.3 thousandths of an inch in thickness.

References Cited

UNITED STATES PATENTS

| | | | |
|---|---|---|---|
| 1,804,361 | 5/1931 | Marcin. | |
| 2,992,127 | 7/1961 | Jones | 117—178 X |
| 3,095,316 | 6/1963 | Hartwig | 117—118 X |
| 3,275,471 | 9/1966 | Lowell | 117—169 |

ALFRED L. LEAVITT, *Primary Examiner.*

H. COHEN, *Assistant Examiner.*